(12) United States Patent
Ennis

(10) Patent No.: US 8,789,545 B2
(45) Date of Patent: Jul. 29, 2014

(54) TIRE APPLICATOR FOR APPLYING A TIRE SOLUTION TO A VEHICLE PASSING THROUGH A VEHICLE WASHING SYSTEM

(76) Inventor: G. Thomas Ennis, Inglewood, CA (US)

(*) Notice: Subject to any disclaimer, the term of this patent is extended or adjusted under 35 U.S.C. 154(b) by 267 days.

(21) Appl. No.: 13/239,204

(22) Filed: Sep. 21, 2011

(65) Prior Publication Data

US 2012/0125379 A1    May 24, 2012

Related U.S. Application Data

(60) Provisional application No. 61/415,033, filed on Nov. 18, 2010.

(51) Int. Cl.
*B08B 3/00* (2006.01)
(52) U.S. Cl.
USPC ........................................................ 134/123
(58) Field of Classification Search
None
See application file for complete search history.

(56) References Cited

U.S. PATENT DOCUMENTS

| 3,431,580 | A  | * | 3/1969  | Cirino et al. ................. 15/302 |
| 6,461,685 | B2 | * | 10/2002 | Gorra ........................... 427/429 |
| 2004/0069328 | A1 | * | 4/2004 | Lin ................................ 134/45 |
| 2006/0207047 | A1 | * | 9/2006 | Weyandt .................... 15/230.13 |
| 2008/0135647 | A1 | * | 6/2008 | France et al. ................ 239/542 |

* cited by examiner

*Primary Examiner* — Jason Ko
(74) *Attorney, Agent, or Firm* — Risso & Associates

(57) ABSTRACT

Described is a tire applicator for applying a tire solution to a vehicle passing through a vehicle washing system. The tire applicator includes a flexible member, such as flexible rods, with a fabric attached thereto. A solution dispenser is included to dispense a tire solution to the fabric. A rod positioning mechanism can be used to position the flexible rods and fabric into the path of the vehicle's tires. When a vehicle drives past the flexible rods, the rods are biased toward the vehicle's tires, thereby causing the tires to rub against the fabric and transfer the tire solution from the fabric to the vehicle's tires.

19 Claims, 4 Drawing Sheets

TIRE APPLICATOR FOR APPLYING A TIRE SOLUTION TO A VEHICLE PASSING THROUGH A VEHICLE WASHING SYSTEM

PRIORITY CLAIM

This is a non-provisional patent application claiming the benefit of priority to U.S. Provisional Application No. 61/415,033, filed on Nov. 18, 2010, entitled, "TIRE APPLICATOR FOR APPLYING A TIRE SOLUTION TO A VEHICLE PASSING THROUGH A VEHICLE WASHING SYSTEM."

BACKGROUND OF THE INVENTION (1) Field of Invention

The present invention relates to vehicle washing systems and, more particularly, to a tire applicator for applying a tire solution to the tires of a vehicle passing through a vehicle washing system.

(2) Description of Related Art

Vehicle washing systems have long been known in the art. By way of example, automatic vehicle-washing systems are well-known and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a spray of clean rinse water, and is then moved to a drying station. Finally, after being washed and dried, the conveyor pushes the vehicle from the washing system.

As an enhancement over traditional vehicle-washing systems, some modern systems have been devised to provide a tire treatment to the vehicle's tires. The tire treatment is tire solution that is intended to improve the look and longevity of the vehicle's tires. Thus, after being washed and dried, a tire solution is sprayed on the passing vehicle's tires. While applicable for applying the tire solution to the passing vehicle's tires, the spray inherently disperses the tires solution onto the vehicle's wheels and other unintended surfaces. Such overspray can be damaging to the environment as it results in excessive dispersal of the chemical tire solution, some of which is washed into the storm drain system or flung from the vehicle's wheels as the vehicle is driven along a road.

Thus, a continuing need exists for a system for applying a tire solution directly to a vehicle's tires as the vehicle passes through a vehicle washing system.

SUMMARY OF INVENTION

While considering the failure of others to make use of all of the above components in this technology space, the inventor unexpectedly realized that a tire applicator that uses a fabric-wrapped flexible rod that is biased toward the vehicle's tires, can be used to directly transfer the tire solution from the fabric to the vehicle's tires.

The tire applicator includes a flexible member, such as flexible rods (e.g., a first and second flexible rod (or any other suitable number)), with a fabric attached thereto. A solution dispenser is included to dispense a tire solution to the fabric. A rod positioning mechanism can be used to position the flexible rods and fabric into the path of the vehicle's tires. When a vehicle drives past the flexible rods, the rods are biased toward the vehicle's tires, thereby causing the tires to rub against the fabric and transfer the tire solution from the fabric to the vehicle's tires.

In another aspect, first and second foam pads are disposed around the first and second flexible rods, respectively. Further, the fabric is wrapped around both the first and second foam pads and, thereby, the first and second flexible rods.

In yet another aspect, each of the first and second flexible rods include a proximal end and a distal end. A rod positioning mechanism is connected with the proximal ends of the flexible rods. The rod positioning mechanism is formed to move the flexible rods from a rest position into a tire path for causing the tire applicator to engage with a vehicle's tires and, upon receiving a signal that the vehicle has passed, cause the flexible rods to return to the rest position.

In another aspect, the flexible rods are formed of a PVC pipe.

Additionally, an end support is connected with the distal ends of the flexible rods. The end support includes at least one roller mechanism for engaging with a ground surface and enabling the flexible rods to slide from a rest position into a tire path.

A housing can be provided for housing the flexible rods in a rest position. The solution dispenser is attached with the housing such that the flexible rods rest below the solution dispenser, with the solution dispenser formed to dispense the tire solution to the fabric when the flexible rods are positioned therebelow. The rod positioning mechanism can be formed to be pneumatically-powered.

Finally, the present invention includes a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to vehicle washing systems and, more particularly, to a tire applicator for applying a tire solution to the tires of a vehicle passing through a vehicle washing system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

Figure 1:
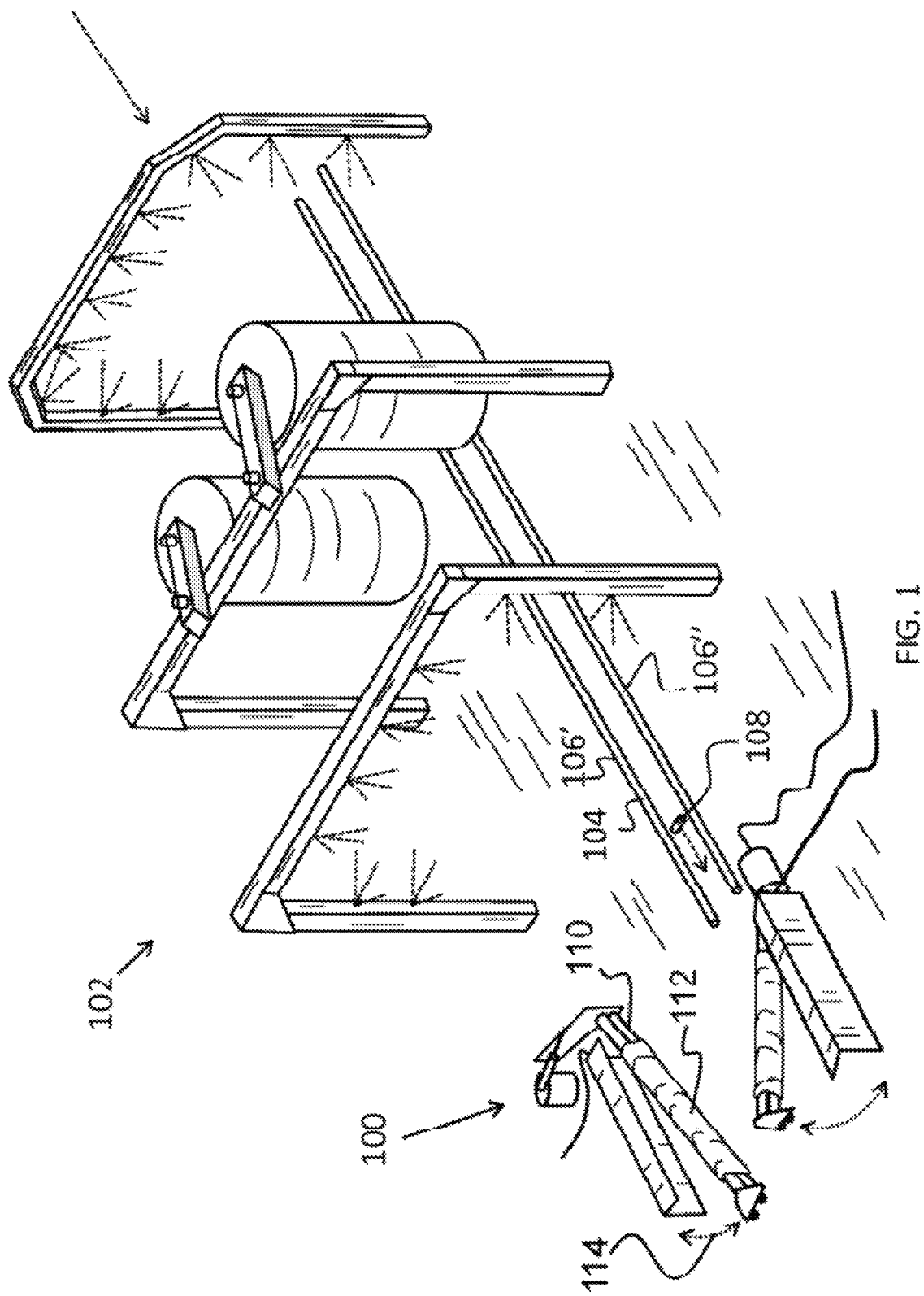
FIG. 1 is an illustration of vehicle washing system incorporating a tire applicator according to the present invention.

As shown in FIG. 1, the present invention is directed to a tire applicator 100 for applying a tire solution to the tires of a vehicle passing through a vehicle washing system 102. Although not required, the vehicle washing system 102 includes a conveyor 104 with a set of guide rails 106' and 106" to direct the vehicle's tires through the vehicle washing system 102. A roller system, such as a chain-pulled roller 108, is used to engage with the tires to push the vehicle through the guide rails 106' and 106" and the washing system 102. Upon exiting the guide rails 106' and 106", the vehicle's tires are introduced to the tire applicator 100, which applies a tire solution directly to the vehicle's tires. Specific details regarding the present invention are provided below.

(2) Specific Details

As noted above, the present invention is directed to a tire applicator for applying a tire solution to a vehicle's tires. As shown in FIG. 1, a set of tire applicators are depicted for applying a tire solution to each of the left and right tires of the vehicle.

Generally speaking, the tire applicator 100 is any suitable mechanism or device that is capable of collecting a tire solution and applying the tire solution directly to a passing tire. As a non-limiting example, each tire applicator 100 includes a flexible member 110 that is covered in a fabric 112 and formed to swing 114 into the tire's path. A solution dispenser can be included that dispenses the tire solution onto the fabric 112, causing the fabric 112 to collect the tire solution. As the flexible member 110 swings 114 out into the tire's path, the tire engages with the fabric 112, which rubs tire solution from the fabric 112 onto the passing tire. Because the flexible member 110 is flexible, it creates a pressure against the tire such that the flexible member 110 and fabric 112 are biased toward the vehicle's tires.

Figure 2:
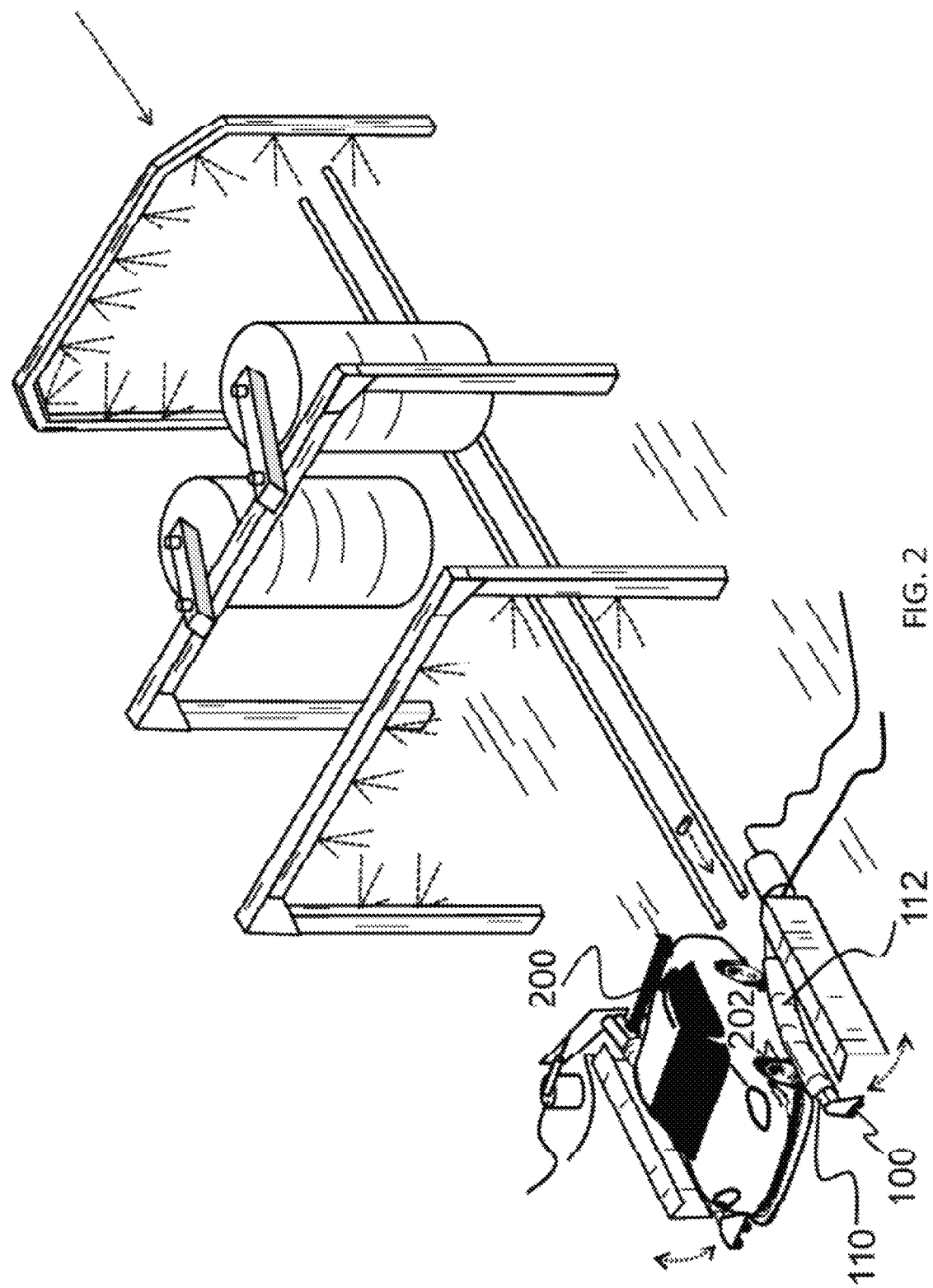
FIG. 2 is an illustration of vehicle washing system incorporating a tire applicator according to the present invention, depicting a vehicle engaging with the tire applicator.

For further understanding, FIG. 2 depicts a vehicle 200 engaging with the tire applicator 100. As shown, the vehicle's tires 202 engage with the fabric 112 wrapped around the flexible member 110, thereby causing the flexible member 110 to bend and bias the flexible member 110 toward the tires 202. Thus, as the tires 202 pass by the fabric 112, tire solution from the fabric 112 is rubbed onto the tires 202.

Figure 3:
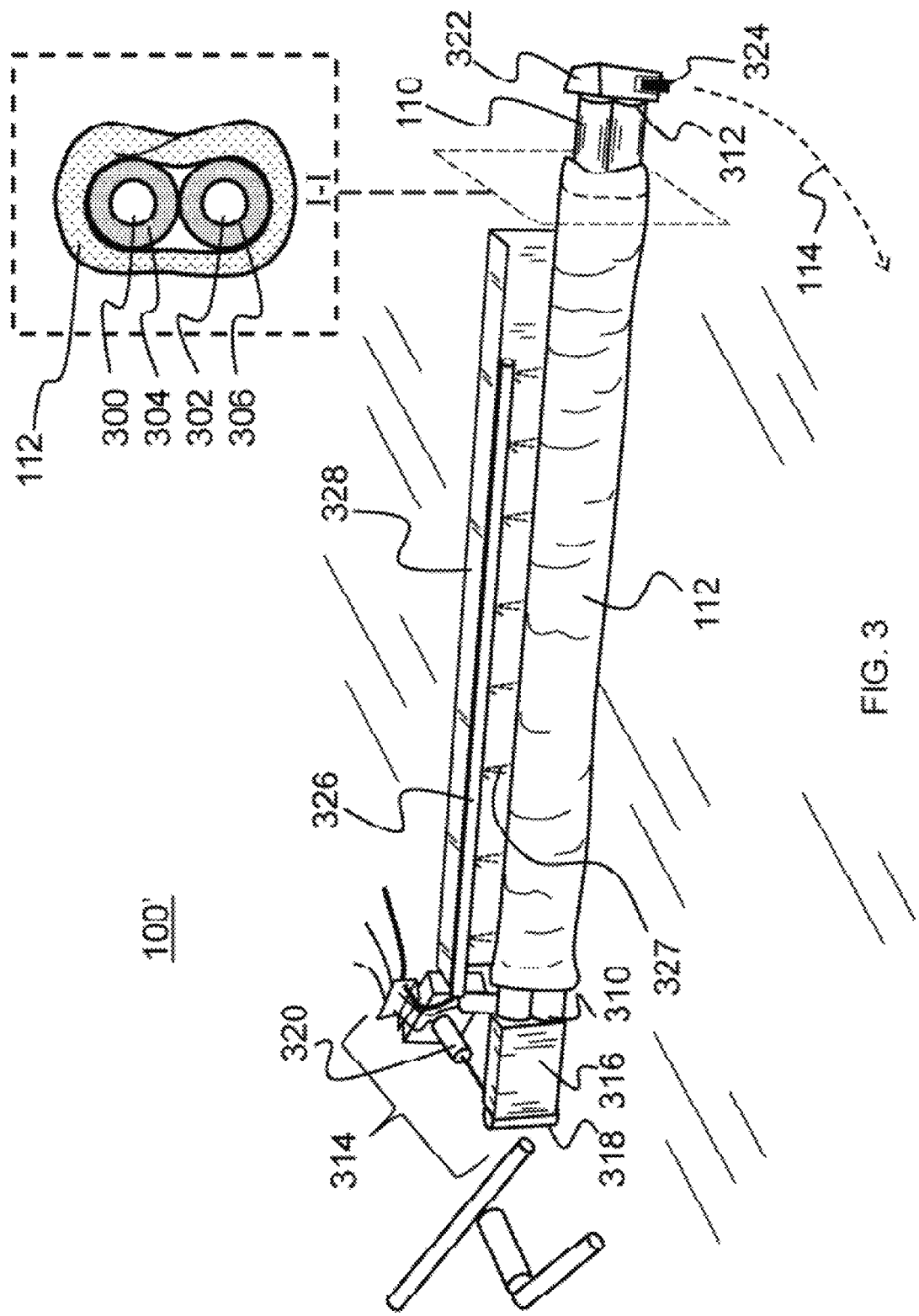
FIG. 3 is an illustration of a tire applicator according to the present invention and FIG. 4 is an illustration of a tire applicator according to the present invention.
Figure 4:
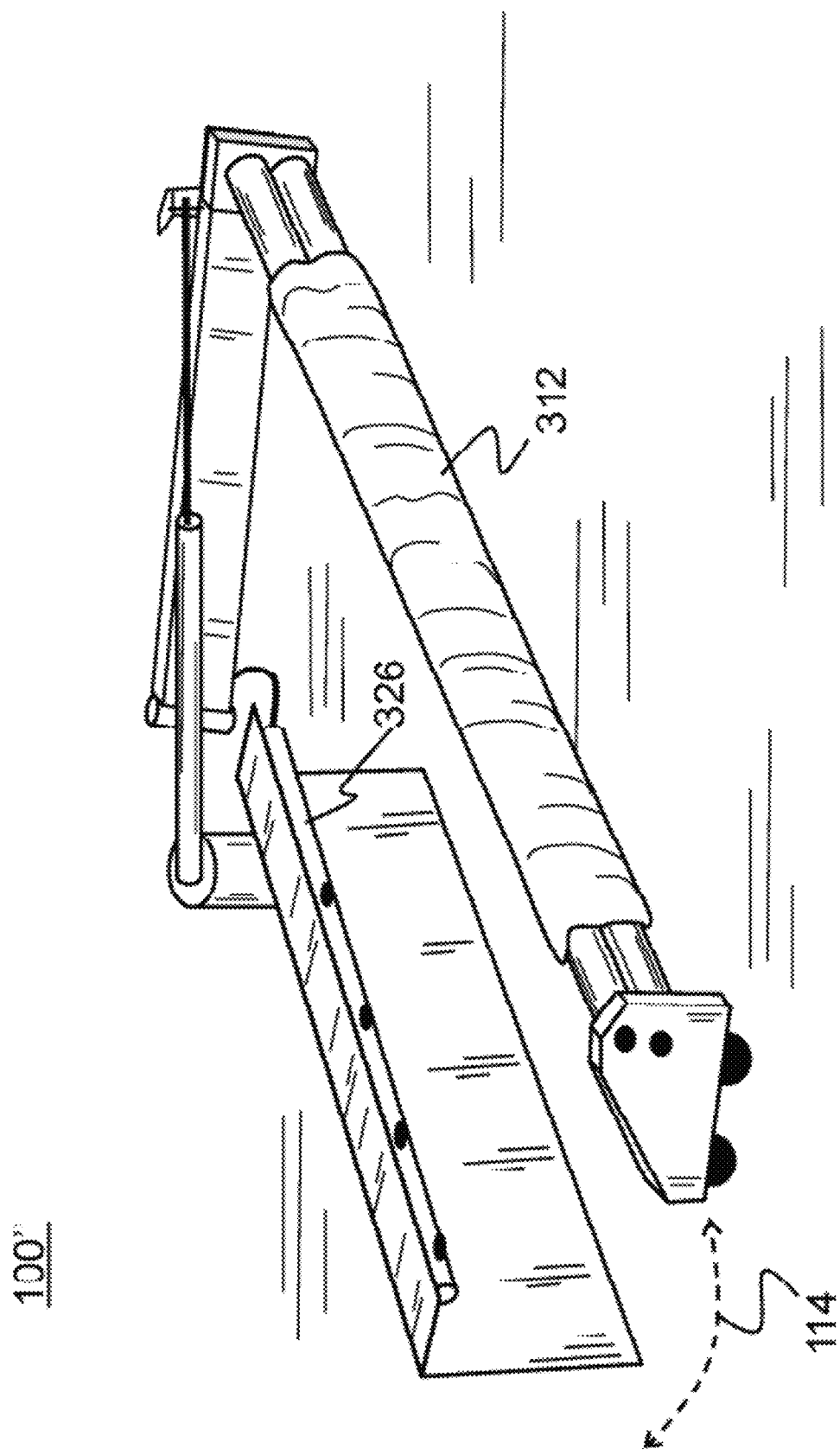

Additional details are shown in FIGS. 3 and 4, which depict close-up illustrations of first 100' and second 100" tire applicators, respectively. As shown in FIG. 3, the first tire applicator 100' includes a flexible member 110. The flexible member 110 is any suitable mechanism or device that is operable for biasing the fabric 112 towards and against a vehicle's tires. For example and as seen in the cross-sectional view I-I, the flexible 110 member can be formed of a first flexible rod 300 and a second flexible rod 302 disposed adjacent to one another. The flexible rods 300 and 302 are formed of any suitably flexible yet semi-rigid material, a non-limiting example of which includes polyvinylchloride (PVC) piping. It should be understood that the flexible member 110 is not limited to a single flexible rod as any suitable flexible device and/or rods can be implemented within the scope and intention of the present invention. However, desirably, a first and second flexible rod 300 and 302 are used as two flexible rods provide sufficient rigidity to allow for controlled movement of the flexible member 110 yet allow the flexible member 110 to bend when contacting a vehicle's tires.

Wrapped around each of the flexible rods 300 and 302 are cushion pads, such as a first foam pad and a second foam pad, 304 and 306, respectively. It should be understood by one skilled in the art that the cushion pads are not limited to foam, as the foam pads are but one non-limiting example of such a suitable cushion device. A non-limiting example of such a foam pad is cylindrical foam tubing, which is commonly available in the open market.

Additionally, attached with the flexible member 110 is a fabric 112. The fabric 112 is attached with the flexible member 110 using any suitable attachment technique. As a non-limiting example, the fabric 112 is stitched to form a fabric tube, with the flexible member 110 positioned therethrough. Thus, in this example, the fabric 112 is wrapped round the flexible member 110 and, thereby, both the first 304 and second 306 foam pads and the first 300 and second 302 flexible rods. It should be understood that although the fabric 112 is described as using the term "fabric," the term is intended to encompass any suitably absorbent material that is operable for collecting and dispersing the tire solution, non-limiting examples of which include a foam, lamms cloth, etc. For example, the material is a polyester type of material that will hold a chemical.

As noted above, the flexible member 110 can be moved (e.g., swung 114 out) into the tire's path to engage with the vehicle's tire. Thus, each of the first 300 and second 302 flexible rods include a proximal end 310 and a distal end 312. A rod (or flexible member) positioning mechanism 314 is attached with the proximal ends 310 of the flexible rods 300 and 302. The rod positioning mechanism 314 is formed to move the flexible rods 300 and 302 from a rest position (as depicted in FIG. 3) into a tire path (as depicted in FIGS. 1, 2 and 4) for causing the tire applicator 100 to engage with a vehicle's tires and, upon receiving a signal that the vehicle has passed, cause the flexible rods to return to the rest position.

The rod positioning mechanism 314 is any suitable mechanism or device capable of moving the flexible member 110 (and the corresponding flexible rods 300 and 302). As a non-limiting example, a mounting bracket 316 is bolted to the rods 300 and 302. The mounting bracket 316 is hingedly 318 connected to a base (e.g., ground surface) or other component, that allows the flexible member 110 to move (i.e., swing 114 out). A pneumatically-powered cylinder 320 is connected with the flexible member 110 to move the flexible member 110 from the rest position into the tire path. Thus, in a desired aspect, the rod positioning mechanism 314 is pneumatically powered.

As noted above, each of the flexible rods 300 and 302 includes a distal end 312. To maintain the rods proximate one another, an end support 322 is connected with the distal ends 312 of the flexible rods 300 and 302. The end support 322 is connected with the rods 300 and 302 via any suitable mechanism or device, a non-limiting example of which includes being bolted to the rods 300 and 302, with bolts passing through the end support 322 and threading into each of the rods 300 and 302. To assist the flexible member 110 in swinging out 314, the end support 322 includes a roller 324, a non-limiting example of which includes a wheel or a series of wheels. Thus, the roller 324 engages with the ground surface and enables the flexible member 110 to slide from the rest position into the tire path.

While in the rest position, the flexible member 110 (and corresponding fabric 312) can be coated with a tire solution. For example, the tire applicator 100' includes a solution dispenser 326 that is formed and positioned to dispense a tire solution onto the fabric 312. The solution dispenser 326 is any suitable mechanism or device that is operable for dispensing a solution, a non-limiting example of which includes a pipe with holes therein. The pipe can be fluidly connected (via piping and/or valves) with a pressurized tank that contains the selected tire solution. Thus, upon receiving a dispense signal, the valves can be opened to cause the tire solution to travel from the pressurized tank and dispense through the solution dispenser 326 onto the fabric.

With respect to the tire solution, it should be understood that the tire solution is any suitable material that is desirably applied to a vehicle's tires. As a non-limiting example of a suitable solution, the tire solution is ArmorAll®, produced by Armor All Products Corp, located at 6 Liberty Drive, Aliso Viejo, Calif. 92656.

A housing 328 can also be included for housing the flexible member 110 when in a rest position. The housing 328 serves to protect the flexible member 110 and fabric 312 while in the rest position. Additionally, the solution dispenser 326 is attached with the housing 328 for dispensing the tire solution 327 onto the fabric 312. As a non-limiting example, the solution dispenser 326 is attached with the housing 328 such that the flexible rods 300 and 302 rest below the solution dispenser 326. Thus, in operation, the solution dispenser 326 dispenses the tire solution 327 to the fabric 312 when the flexible rods 300 and 302 are positioned therebelow.

For further understanding, FIG. 4 illustrates the second tire applicator 100" after having been moving from the rest position. As shown, the solution dispenser 326 can be used to dispense a tire solution onto the fabric 312, after which the flexible member 110 is moved 114 from the rest position into the path of a vehicle's tires.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. For example, an alternative design to the solution dispenser would be to pipe the tire solution directly into the flexible rods (which in this example would include appropriate holes therethrough), with the tire solution dispensing from the flexible rods and into the surrounding fabric. This example would also require appropriate holes through the foam pad, or removing the foam pad altogether.

What is claimed is:

1. A tire applicator for applying a tire solution to a vehicle passing through a vehicle washing system, comprising:
   a first flexible rod having a long axis, the first flexible rod positioned, such that the long axis is positioned substantially parallel with a ground surface, the rod being formed of a material that is sufficiently flexible to bend when engaging with a vehicle's tires and be biased towards the vehicle's tires when bent;
   a fabric attached with the first flexible rod;
   a solution dispenser formed to dispense a tire solution to the fabric; and
   a rod positioning mechanism connected with the flexible rod, the rod positioning mechanism being operable to move the flexible rod from a rest position into a tire path for causing the tire applicator to engage with a vehicle's tires and, upon receiving a return signal, cause the flexible rod to return to the rest position, whereby when a vehicle drives past the first flexible rod, the first flexible rod is biased toward the vehicle's tires, thereby causing the tires to rub against the fabric and transfer the tire solution from the fabric to the vehicle's tires.

2. The tire applicator as set forth in claim 1, further comprising a second flexible rod positioned adjacent to the first flexible rod.

3. The tire applicator as set forth in claim 2, further comprising a first and second foam pads, each of the first and second foam pads being disposed around the first and second flexible rods, respectively.

4. The tire applicator as set forth in claim 3, wherein the fabric is wrapped around both the first and second foam pads and, thereby, the first and second flexible rods.

5. The tire applicator as set forth in claim 4, wherein each of the first and second flexible rods include a proximal end and a distal end, and wherein the rod positioning mechanism is connected with the proximal ends of the flexible rods, the rod positioning mechanism being formed to move the flexible rods from a rest position into a tire path for causing the tire applicator to engage with a vehicle's tires and, upon receiving a signal that the vehicle has passed, cause the flexible rods to return to the rest position.

6. The tire applicator as set forth in claim 5, wherein the flexible rods are formed of a PVC pipe.

7. The tire applicator as set forth in claim 6, further comprising an end support connected with the distal ends of the flexible rods, the end support having at least one roller mechanism for engaging with a ground surface and enabling the flexible rods to slide from a rest position into a tire path.

8. The tire applicator as set forth in claim 7, further comprising a housing for housing the flexible rods in a rest position, the housing having a top cover such that when the flexible rods are in the rest position, they are positioned beneath the top cover, and wherein the solution dispenser is attached with the housing such that the flexible rods rest below the solution dispenser, with the solution dispenser formed to dispense the tire solution to the fabric when the flexible rods are positioned therebelow.

9. The tire applicator as set forth in claim 8, wherein the rod positioning mechanism is pneumatic-powered.

10. The tire applicator as set forth in claim 2, wherein each of the first and second flexible rods include a proximal end and a distal end, and wherein the rod positioning mechanism is connected with the proximal ends of the flexible rods, the rod positioning mechanism being formed to move the flexible rods from a rest position into a tire path for causing the tire applicator to engage with a vehicle's tires and upon receiving a signal that the vehicle has passed, cause the flexible rods to return to the rest position.

11. The tire applicator as set forth in claim 10, further comprising an end support connected with the distal ends of the flexible rods, the end support having at least one roller mechanism for engaging with a ground surface and enabling the flexible rods to slide from a rest position into a tire path.

12. The tire applicator as set forth in claim 1, wherein the rod positioning mechanism is pneumatic-powered.

13. The tire applicator as set forth in claim 1, wherein the first flexible rod includes a proximal end and a distal end, and further comprising an end support connected with the distal end of the flexible rod, the end support having at least one roller mechanism for engaging with a ground surface and enabling the flexible rod to slide from a rest position into a tire path.

14. The tire applicator as set forth in claim 1, wherein the flexible rod is formed of a PVC pipe.

15. The tire applicator as set forth in claim 1, further comprising a housing for housing the flexible rod in a rest position, the housing having a top cover such that when the flexible rod is in the rest position, the flexible rod is positioned beneath the top cover, and wherein the solution dispenser is attached with the housing such that the flexible rod rests below the solution dispenser, with the solution dispenser formed to dispense the tire solution to the fabric when the flexible rod is positioned therebelow.

16. A tire applicator for applying a tire solution to a vehicle passing through a vehicle washing system, comprising:
   a first flexible rod having a long axis, the rod being formed of a material that is sufficiently flexible to bend when engaging with a vehicle's tires and be biased towards the vehicle's tires when bent;
   a fabric attached with the first flexible rod;
   a solution dispenser formed to dispense a tire solution to the fabric; and
   a rod positioning mechanism connected with the flexible rod, the rod positioning mechanism being operable to move the flexible rod from a rest position, at which the long axis of the flexible rod is substantially parallel with a ground surface, to an application position, at which the flexible rod is maintained substantially parallel with a ground surface and moved into a tire path for causing the tire applicator to engage with a vehicle's tires and, upon receiving a return signal, cause the flexible rod to return from the application position to the rest position, whereby when a vehicle drives past the first flexible rod, the first flexible rod is biased toward the vehicle's tires, thereby causing the tires to rub against the fabric and transfer the tire solution from the fabric to the vehicle's tires.

17. A tire applicator for applying a tire solution to a vehicle passing through a vehicle washing system, comprising:
   a controller;
   a first flexible rod, the rod being formed of a material that is sufficiently flexible to bend when engaging with a vehicle's tires and be biased towards the vehicle's tires when bent;
   a fabric attached with the first flexible rod;
   a solution dispenser formed to dispense a tire solution to the fabric; and
   a rod positioning mechanism connected with the flexible rod, the rod positioning mechanism, upon receiving an activation signal from the controller, being operable to move the flexible rod from a rest position into a tire path for causing the tire applicator to engage with a vehicle's tires and, upon receiving a return signal from the controller, causing the flexible rod to return to the rest position, whereby when a vehicle drives past the first flexible rod, the first flexible rod is biased toward the vehicle's tires, thereby causing the tires to rub against the fabric and transfer the tire solution from the fabric to the vehicle's tires.

18. A tire applicator for applying a tire solution to a vehicle passing through a vehicle washing system, comprising:
   a controller;
   a first flexible rod, the rod being formed of a material that is sufficiently flexible to bend when engaging with a vehicle's tires and be biased towards the vehicle's tires when bent;
   a fabric attached with the first flexible rod;
   a solution dispenser formed to dispense a tire solution to the fabric; and
   a housing for housing the flexible rod in a rest position, the housing having a top cover such that when the flexible rod is in the rest position, the flexible rod is positioned beneath the top cover; and
   a rod positioning mechanism connected with the flexible rod, the rod positioning mechanism being operable to move the flexible rod from the rest position and away from the housing, such that as the flexible rod is moved away from the housing, the flexible rod is moved into a tire path for causing the tire applicator to engage with a vehicle's tires and, upon receiving a return signal, from the controller the rod positioning mechanism is operable to cause the flexible rod to retract to the rest position where it is positioned beneath the top cover.

19. A tire applicator for applying a tire solution to a vehicle passing through a vehicle washing system, comprising:
   a first flexible rod, the rod being formed of a PVC material that is sufficiently flexible to bend when engaging with a vehicle's tires such that as a user turns the vehicle's tires into or away from the flexible rod, the flexible rod bends and is biased towards the vehicle's tires when bent to follow the vehicle's tires;
   a fabric attached with the first flexible rod;
   a solution dispenser formed to dispense a tire solution to the fabric; and
   a rod positioning mechanism connected with the flexible rod, the rod positioning mechanism being operable to move the flexible rod between a rest position and an application position, such that when in the rest position, the flexible rod is removed from a tire path and when in the application position the flexible rod is positioned into the tire path for causing the tire applicator to engage with the vehicle's tires, whereby when a vehicle drives past the first flexible rod, the first flexible rod is biased toward the vehicle's tires thereby causing the tires to rub against the fabric and transfer the tire solution from the fabric to the vehicle's tires.

* * * * *